(12) United States Patent
Lo

(10) Patent No.: US 6,536,202 B2
(45) Date of Patent: Mar. 25, 2003

(54) JET ENGINE HAVING COMPRESSED AIR NET PREVENTING INHALATION OF OBJECTS TO PREVENT FOD

(76) Inventor: Hsin-Hsin Lo, No. 9, Alley 3, Lane 35, Weitao Rd., North Dis., Taichung (TW)

( * ) Notice: Subject to any disclaimer, the term of this patent is extended or adjusted under 35 U.S.C. 154(b) by 0 days.

(21) Appl. No.: 09/930,728

(22) Filed: Aug. 15, 2001

(65) Prior Publication Data

US 2003/0033795 A1 Feb. 20, 2003

(51) Int. Cl.[7] ................................................. F02G 3/00
(52) U.S. Cl. .................................. 60/39.092; 244/53 B
(58) Field of Search ....................... 60/39.092; 244/53 B

(56) References Cited

U.S. PATENT DOCUMENTS 5,058,617 A * 10/1991 Stockman et al. .......... 137/15.1
5,431,535 C1 * 1/2001 Klujber .................... 415/121.2

* cited by examiner

*Primary Examiner*—Charles G. Freay
*Assistant Examiner*—John F Belena

(57) ABSTRACT

A jet engine comprises a housing having an inlet. An air net device is located adjacent to the inlet cowl so as to create an air net configured by compressed air streams for adequately blowing foreign objects from entering the inlet.

15 Claims, 6 Drawing Sheets

JET ENGINE HAVING COMPRESSED AIR NET PREVENTING INHALATION OF OBJECTS TO PREVENT FOD

FIELD OF THE INVENTION

The present invention relates to a jet engine, and more particularly to a jet engine having an air net selectively created to prevent inhalation of objects to prevent FOD (Foreign Object Damage).

DESCRIPTION OF THE PRIOR ART

The dangerous situation of any aircraft, both commercial and military, is during approaching and leaving a runway of an airport. During the approaching toward and leaving away from the airport, the attitude of the aircraft is such that engines may easily inhale foreign objects thereby damaging the turbine engine. This is generally referred to as Foreign Object Damage, FOD.

The FOD is generally resulted by inhaling birds and debris on the runway. Once the turbine inhaled a foreign object, blades on the turbine will consequently be damaged more or less under the impact imposed by the foreign object. In a minor FOD, the engine may simply reduce it output thrust, while in a severe situation, the aircraft is forced to take an emergency landing or even crash immediately, especially for a combat airplane. However, when we check those foreign objects, it can be easily categorized into 1) metal, 2) gravels; and 3) others, including wood, ice cube and birds. If we further categorize those foreign objects by 1) preventable; and 2) unavoidable, then the preventable foreign objects are 1) debris of the guiding lamp on the runway; 2) soils introduced by vehicles; 3) broken parts from the airplane, such as nut, bolt, washer, screws, tube etc; 4) debris of rubber wheel; 5) gravels, rugs, plastic scattered on the runway; 6) tars, cement and other construction material; and 7) badges of personnel. The above mentioned foreign objects can be carefully prevented by cleaning the runway and/or working area frequently. In addition, by strictly requesting the personnel follow the operational procedures, those foreign objects can be carefully removed from the runway thereby prevent the FOD happened to the airplane during landing and takeoff.

The unavoidable foreign objects include birds, squirrel, rat and rabbits inhabited around the runway. Among those animals, the birds, generally referred to as "birds strike", are most unpredictable and difficult to prevent.

In order to prevent the airplane from being hit by birds, many measurements have been taken, which can be divided into 1) eliminating physically or chemically; and 2) expelling. In term of the eliminating, shotgun and traps are widely used to eliminate the birds approaching the runway. The following chemicals are also commonly used to eliminate the approaching birds, such as Alpha Choralose, 3-chloro-p-toluidin hydro-chloride, and fenthion. In view of the expelling, gas canyon, fireworks, forged eagles and tanned eagles are all used to expel the birds approaching the runway. Sometimes, even remote controlled airplane model, and siren are also used to expel the approaching birds.

However, those above described precautions are costly and many labors have to be involved. In addition, many of the measurements can only be done during the daylight with excellent visions within the limited area, such as the area adjacent to the runway. By the way, the chemicals and noises used will create more or less the pollutions which offense the residence near the airport.

According to the statistics, the birds strike are generally happened under two thousand feet, especially under one hundred feet in which the airplane is approaching and departing to and from the runway. This is a critical condition to any airplane because the airplane will almost immediately crash if the engines are too damaged to provide enough thrust. Apparently, many of the measurements mentioned above cannot reach the area under two thousand feet. Once the airplane exceeds the attitude of two thousand feet, since no birds can fly to such limit, no bird strike will happen.

SUMMARY OF THE INVENTION

It is the object of this invention to provide a jet engine having an air net device located adjacent to an inlet thereof and selectively created an air net to prevent objects from being inhaled into the engine.

In order to achieve the objective set forth, a jet engine in accordance with the present invention comprises a housing having an inlet. An air net device is located adjacent to the inlet cowl so as to create an air net configured by compressed air streams for adequately blowing foreign objects from entering the inlet.

According to one aspect of the present invention, the compressed air streams of the air net are generated by the engine and which are selectively triggered by valves.

BRIEF DESCRIPTION OF THE DRAWINGS

Other objects and further features of the present invention will be apparent from the following detailed description when read in conjunction with the accompanying drawings, in which:

FIG. 3 is a perspective view of the air net which is triggered on;

FIG. 4 is an illustration view showing operation of the air net is triggered on;

DETAILED DESCRIPTION OF THE PREFERRED EMBODIMENTS

Figure 2:
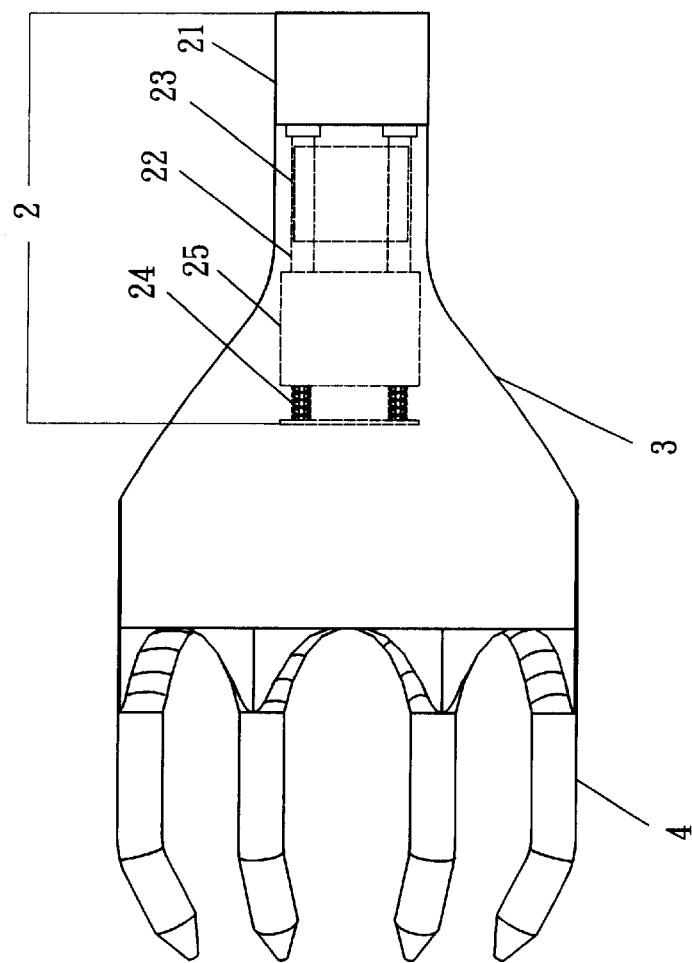
FIG. 2 is a side view of the air net of FIG. 1.
Figure 1:
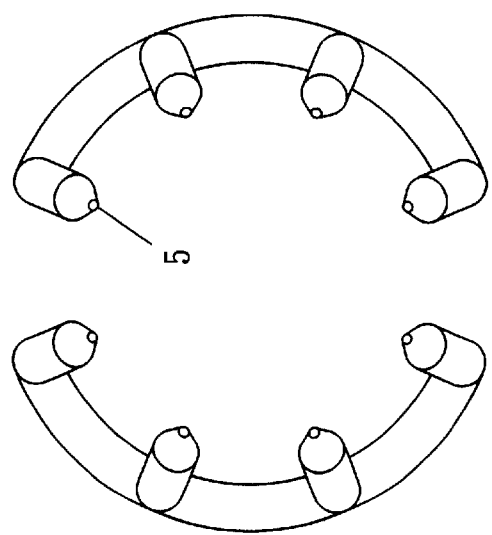
FIG. 1 is a front view of an air net in accordance with the present invention.
Figure 3:
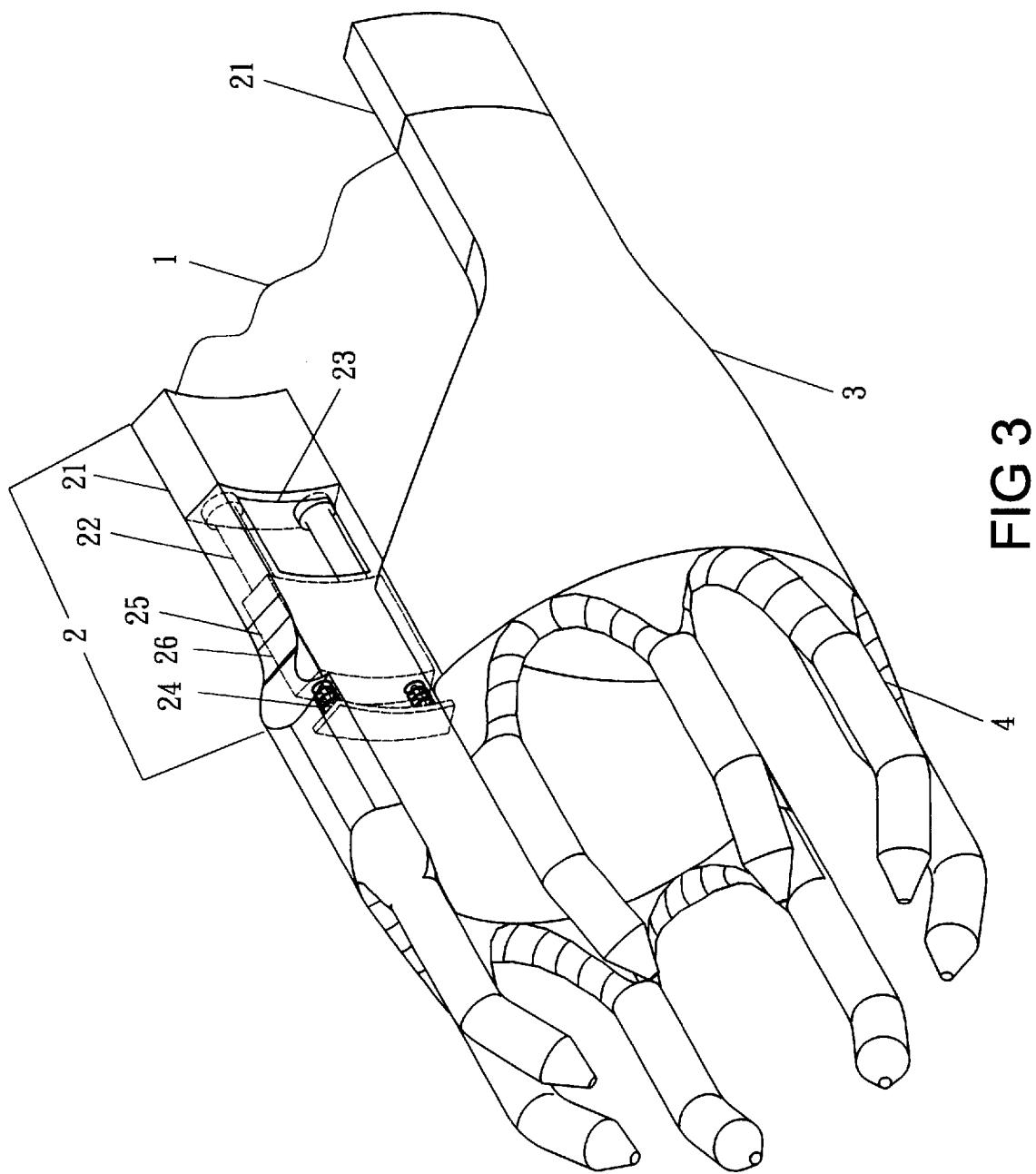

Referring to FIGS. 1 to 6, an air net device in accordance with the present invention generally includes a housing attached to a jet engine 1. The air net device includes a controlling device 2 having an orifice 23 selectively in communication with the jet engine 1. The housing further includes a manifold 3 having a plurality of conduits 5 connected thereto and circumferentially arranged around and adjacent to an inlet cowl 6 of the engine 1. Each conduit 5 includes a nozzle 5 directing toward an airflow entrance of the engine 1.

The controlling device 2 generally includes a hydraulic pump 21 having a piston 22 reciprocally moved in and out. A door 25 is connected to the piston 22 for closing the orifice 23 communicating with inside of the engine 1. The door 25 is generally guided by a pair of pillars (not labeled) on which a coil spring 24 is mounted for biasing the door 25 to constantly block the orifice 23.

During the operation of the jet engine 1, the inhaled air will be compressed by blades of turbine of the engine 1. The compressed air is then carefully directed to the conduits 4 of the air net device through the orifice 23 and finally ejected through the nozzles 5. During the normal situation, i.e. the airplane flies above two thousand feet, the orifice 23 is constantly blocked by the door 25 therefore no compressed air flow will be directed to the conduit 4. Accordingly, there is no air net shroud 7 formed in front of the engine 1.

However, when the airplane approaches to an airport and descends below two thousand feet or during take-off from the runway, the hydraulic pump 21 is actuated such that the piston 22 is extended to move the door 25 from the orifice 23 to a position shown by numeral reference 26, thereby directing compressed air flow toward the conduit 4 through the orifice 23, and finally the compressed air flow ejects from the nozzles 5 thereby creating an air net shroud 7 which effectively block the foreign objects entering the engine 1 by blowing the objects away from the inlet 6 of the engine 1. The orifice 23 is further closed by the door 25 as an actuation of the hydraulic pump 21 and the piston 22. Once the orifice 23 is closed, no compressed air flow will be directed to the conduits 4, accordingly no air net shroud 7 is formed. The airplane then flies under a normal flying mode.

Figure 4:
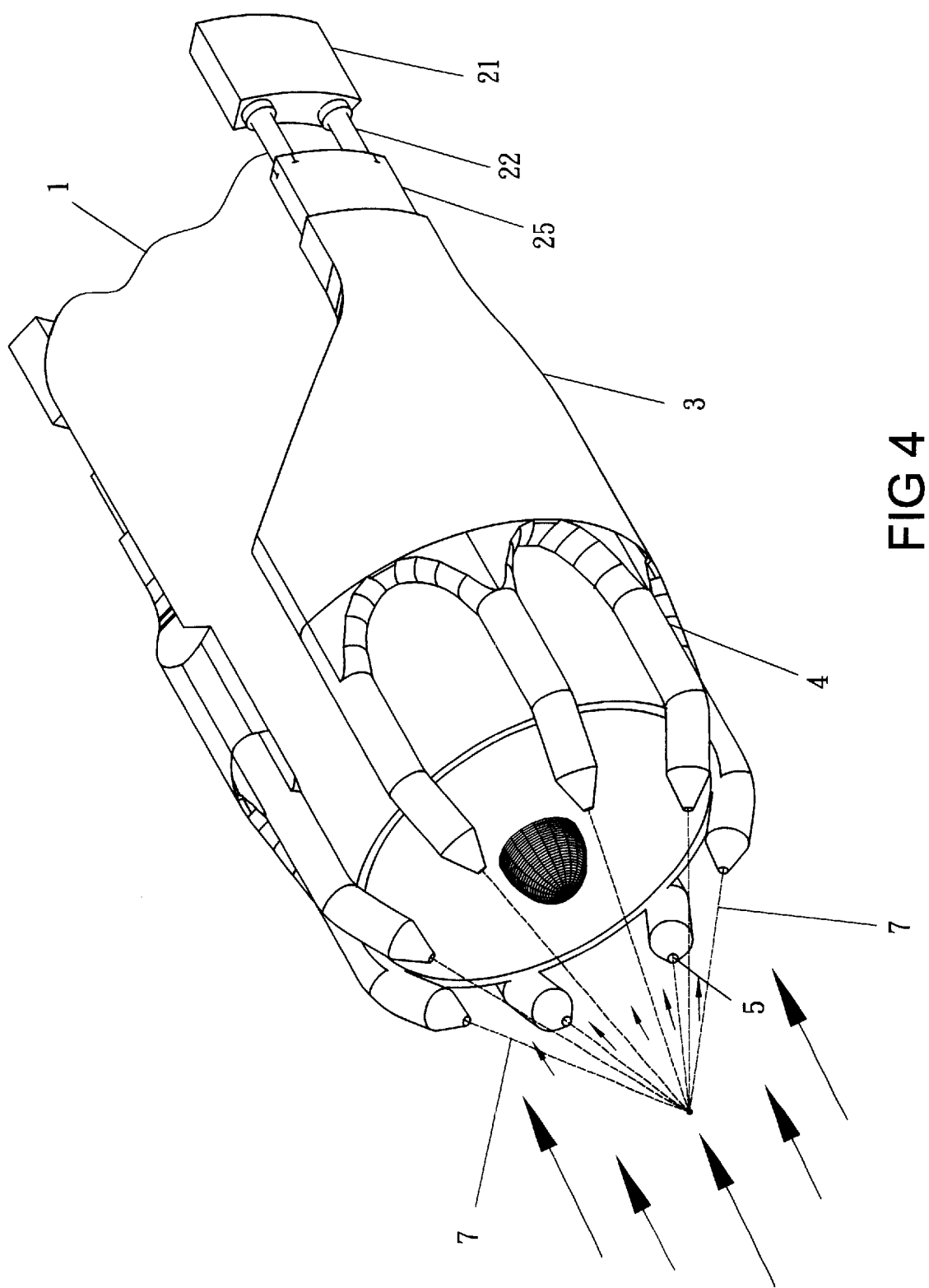
Figure 5:
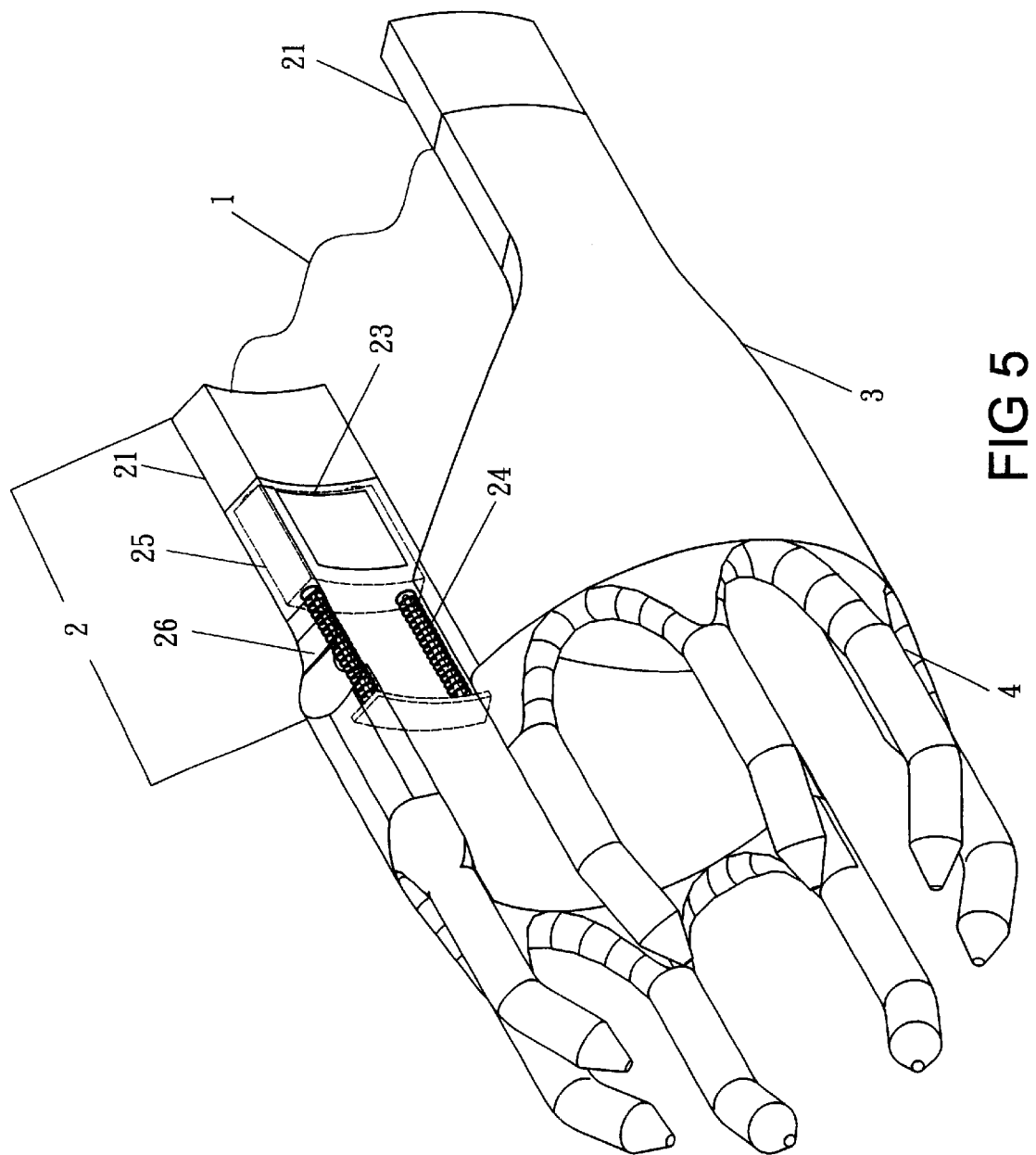
FIG. 5 is similar to FIG. 4 in which a controlling device of the air net is switched off.
Figure 6:
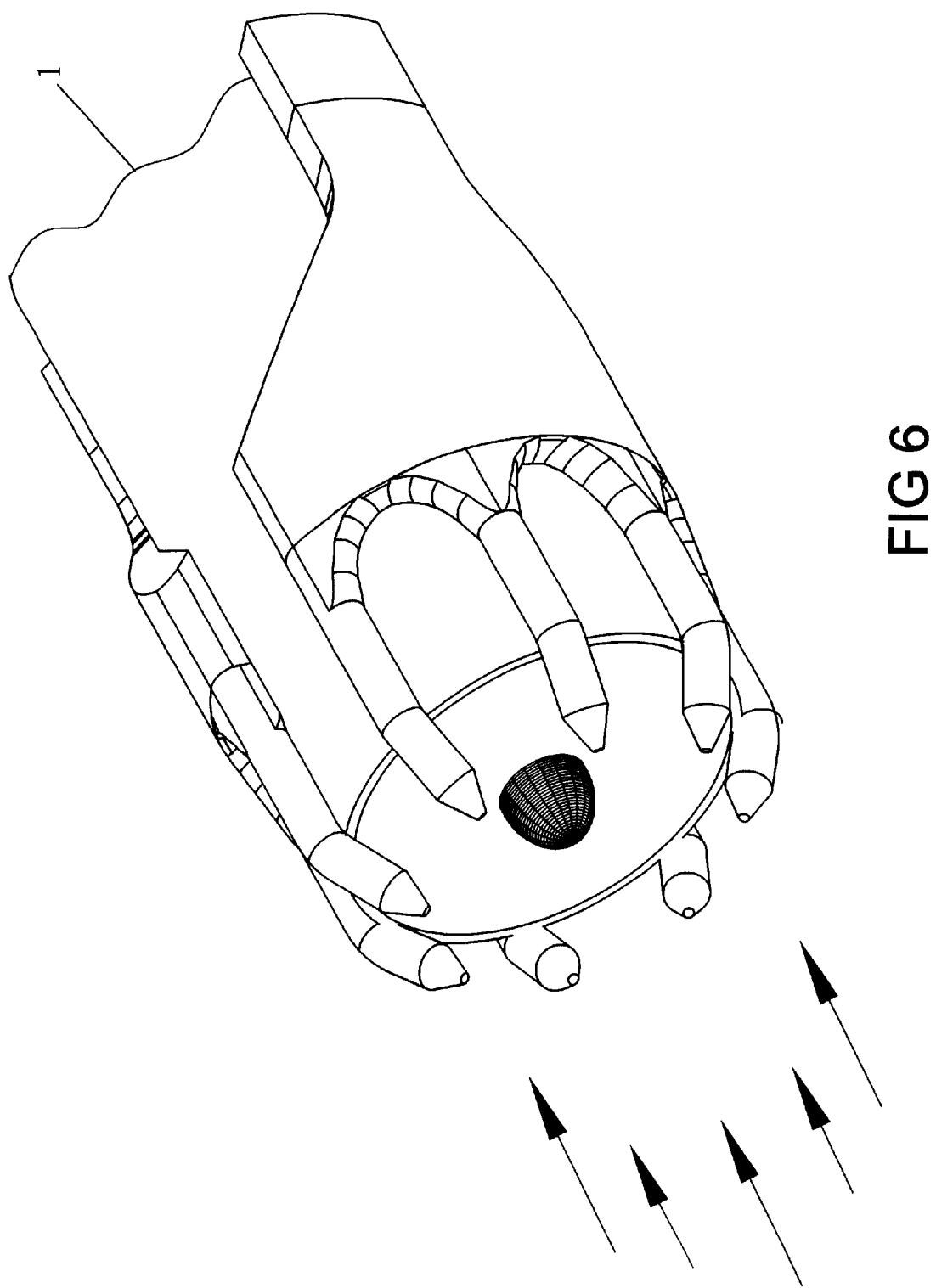
FIG. 6 is similar to FIG. 4 in which the air net is triggered off.

According to the present invention, the nozzles 5 is directed such that the air net shroud 7 is defined in three to seven meters (3 to 7 m) adjacent to inlet 6 of the engine 1. As shown in FIG. 4, once the air net shroud 7 is formed in the front of the engine 1, any incoming objects can be easily and efficiently distracted and blown away from entering the engine 1. For example, if the airplane is flying under two thousand feet and a bird emerges in the flying course of the airplane. Without the air net shroud 7, the bird will naturally be inhaled into the engine 1. However, when the air net shroud 7 is formed by the air net device configured according to the present invention, an invisible barrier (air net shroud 7) is then created by the compressed air streams and will effectively eject the incoming bird away from its intended course once the bird is in contact with the air net shroud 7 thereby effectively preventing the bird from being inhaled. As a result, the FOD to the engine will be adequately prevented.

On the other hand, air flow speed of the compressed air is the ejected air speed pluses the speed of the airplane. Accordingly, the bird will be completely distracted and blown away from it original flying course.

As described above, the air net device in accordance with the present invention is triggered on only when the airplane descends under two thousand feet and during takeoff. Once the airplane ascends above two thousand feet, the air net device is switched off and airplane flies through its normal procedure. On the other hand, during the takeoff, the air net is also triggered on to prevent not only birds strike, but also prevent inhalation of debris from the runway. By this arrangement, the FOD can be completely prevented or reduced to a certain level.

Figure 7:
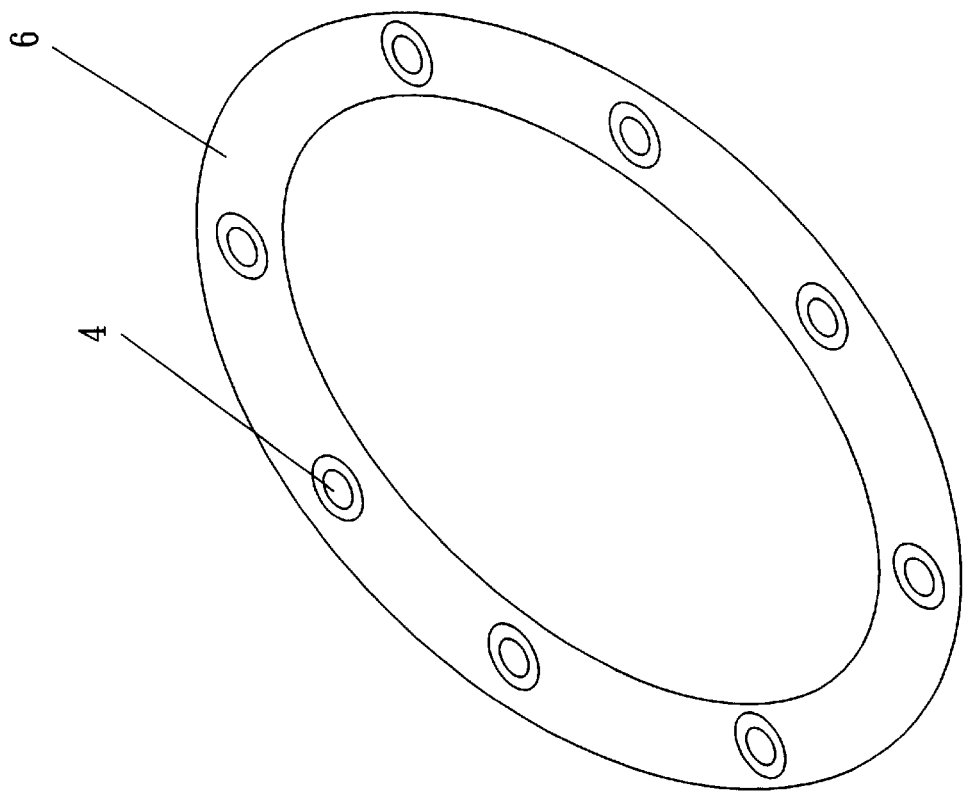
FIG. 7 is an end view of an air net used for inlet cowl of commercial airplane.
Figure 8:
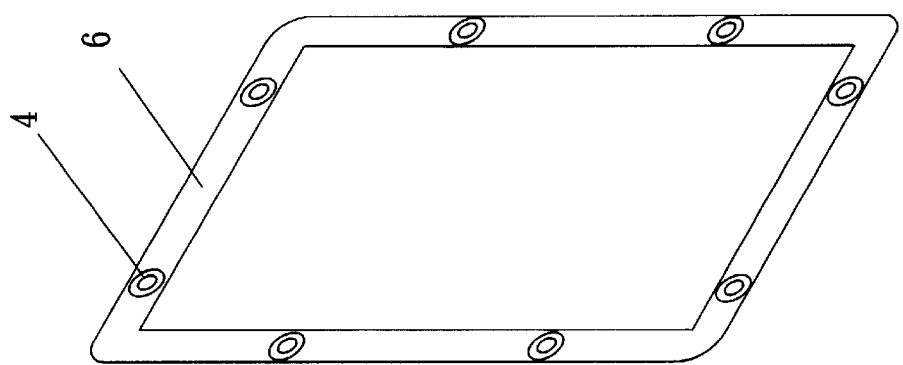
FIG. 8 is an end view of an air net used for inlet cowl of combat airplane.

The air net device accordance with the present invention can be applied to both commercial airplane (FIG. 7) and combat airplane (FIG. 8) to effectively prevent the FOD.

The present invention can be at least concluded with the following advantages.

1. As stated, the compressed air streams are generated by engine of the airplane. When the airplane descends below two thousand feet when approaches to the runway, the ground speed is also reduced to about 250 miles per hour (463 kilometers per hour). Under such circumstance, the actuation of the air net device will not negatively influence the output thrust of the engine, while the air net created can effectively prevent the FOD.

2. The operation of the air net is quite simple to operate. The captain can easily push a button to trigger on the air net when needed. It does not create any complexity to the maneuver of the aircraft.

3. On the other hand, during the actuation of the air net, the engine is not at its maximum output. As a result, the output of the engine can be fully utilized on both generating the thrust to lift the aircraft, as well as creating the air net to prevent FOD.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A jet engine, comprising:

a housing having an inlet cowl; and an air net device located adjacent to said inlet cowl so as to create an air net configured by compressed air streams for adequately blowing foreign objects from entering said inlet.

2. The jet engine as recited in claim 1, wherein said compressed air streams are generated by a plurality of nozzles located adjacent to said inlet cowl.

3. The jet engine as recited in claim 2, wherein said nozzles are directed to a common direction.

4. The jet engine as recited in claim 1, wherein said compressed air streams are supplied by said jet engine.

5. The jet engine as recited in claim 4, wherein said compressed air streams are supplied to said nozzles by conduits.

6. The jet engine as recited in claim 5, wherein said conduits are controlled by a valve located in said housing of the jet engine.

7. A jet engine, comprising:

a housing having an inlet cowl; and an air net device in contact to said housing and having an orifice in communication with said housing; and a controlling device within said air net device including a door sealing said orifice, said door being selectively opened such that compressed air form said jet engine can flow into said air net device to create an air net.

8. The jet engine as recited in claim 7, wherein said door is driven by a piston of a hydraulic pump.

9. The jet engine as recited in claim 8, wherein said door is further biased by a coil spring in a direction opposite to said piston such that said door is constantly sealed to said orifice when said piston is not operated.

10. The jet engine as recited in claim 7, wherein the air net device includes a manifold with a plurality of conduits extending therefrom.

11. The jet engine as recited in claim 10, wherein each conduit further includes a nozzle at an end thereof for directing the compressed air to generate an air net shroud in the front of the jet engine.

12. An air net device in contact with a jet engine, comprising:

a housing including a manifold having an orifice in communication with said jet engine;

a plurality of conduits extending from said manifold;

a door sealing said orifice; and a controlling device selectively triggered to remove said door from said orifice to establish air flow communication between said manifold and said engine.

13. The air net device as recited in claim 12, wherein said door is removed from said orifice by a piston.

14. The air net device as recited in claim 12, wherein said door is biased by a spring device such that the orifice is constantly closed.

15. The air net device as recited in claim 12, wherein each conduit includes a nozzle directing the compressed air flow to blow an incoming foreign object from entering said jet engine.

\* \* \* \* \*